United States Patent Office 3,509,204
Patented Apr. 28, 1970

3,509,204
PROCESS FOR PREPARING NUCLEAR CHLORINATED AROMATIC COMPOUNDS
Charles M. Selwitz, Pitcairn, Pa., assignor to Gulf Research & Development Company, Pittsburgh, Pa., a corporation of Delaware
No Drawing. Filed Dec. 19, 1966, Ser. No. 602,471
Int. Cl. C07c 25/06, 69/78
U.S. Cl. 260—476                                12 Claims

ABSTRACT OF THE DISCLOSURE

A process for preparing a nuclear chloro aromatic which comprises heating an aromatic compound selected from the group consisting of an aromatic hydrocarbon, a haolgenated aromatic hydrocarbon and an ester of an aromatic acid with a catalyst selected from the group consisting of iron, a Group 8 noble metal, a compound of iron or a compound of a Group 8 noble metal, a substance selected from the group consisting of nitrate ions and species convertible to nitrate ions, a carboxylic acid solvent having from 1 to 10 carbon atoms and perchloric acid.

---

This invention relates to a process for preparing a nuclear chloro aromatic, particularly to a process for preparing chlorobenzene.

I have found that an aromatic compound can be chlorinated effectively at low temperatures by the expedient of heating a mixture containing an aromatic compound, a compound selected from the group consisting of iron, noble metals, iron compounds and noble metal compounds, a nitrate ion or a species convertible to a nitrate ion and perchloric acid. This is surprising since in application Ser. No. 602,588, filed concurrently herewith, the same mixture in the absence of percholric acid will result in phenyl acetate, for example, and in application Ser. No. 602,470, filed concurrently herewith, now U.S. Patent No. 3,401,207, in the absence of a nitrate ion biphenyl, for example, will be produced.

The aromatic hydrocarbon reactant employed herein can be an aromatic hydrocarbon, a halogenated (chloro, bromo, fluoro or iodo) aromatic hydrocarbon, or an ester of an aromatic acid wherein the substituent thereof can be derived from methanol, ethanol and higher straight and branched chain alcohols. Of these methanol and ethanol are preferred. Examples of such aromatic hydrocarbons that can be employed herein include benzene, toluene, ethylbenzene, cumene, naphthalene, anthracene, biphenyl, phenanthranene, t-butyl benzene, α-phenylnaphthalene, para xylene, polystyrene, terphenyl, 3-phenylheptane, 1,4-diphenyl butane, diphenyl methane, tetralin, propylium anion, etc.

Also present in the reaction system, as pointed out above, is iron, a nobel metal (platinum, palladium, iridium, rhodium, osmium and ruthenium), iron compounds and compounds of nobel metals. Examples of iron compounds herein include metallic iron, ferric acetate, ferric propionate, ferric hydroxy acetate, ferric chloride, ferric hydroxide, ferric nitrate, ferric phosphate, ferric sulfate, ferrous acetate, ferrous nitrate, ferrous lactate, ferrous bromide, etc. Examples of noble metal compounds include palladium, rhodium, iridium, osmium, ruthenium, platinum, rhodium formate, palladium acetate, palladium propionate, iridium butyrate, palladium pivalate, palladium octanoate, osmium isooctanoate, palladium benzoate, palladium laurate, ruthenium stearate, palladium isobutyrate, palladium para toluene, platinum gamma-chloro butyrate, ruthenium tetracontanoate, osmium phenylacetate, iridium cyclohexane carboxylate, rhodium crotonate, palladium furoate, palladium heptanoate, palladium eicosanoate, palladium chloride, palladium nitrate, palladium oxide, rhodium bromide, iridium sulfate, osmium cyanide, ruthenium perchlorate, rhodium iodide, platinum fluoride, platinum phosphate, platinum pyrophosphate, ruthenium oxide, platinic bromide, platinous bromide, platinum oxide, platinous cyanide, platinum hydroxide, rhodium sulfate, rhodium oxide, osmium tetroxide, ruthenium trichdoride, iridium oxide, etc.

Of the noble metal compounds that are employed herein, I prefer a carboxylic acid salt of a noble metal. Thus, the cationic portion of the salt can be one of the defined noble metals, preferably palladium, while the anionic portion thereof can be derived from the group of carboxylic acids, straight and branched chain, having from one to 40 carbon atoms, preferably from two to six carbon atoms. Examples of such carboxylic acids are formic, acetic, propionic, butyric, pivalic, octanoic, isooctanoic, benzoic, lauric, stearic, isobutyric, para toluic, gamma-chlorobutyric, tetracontanic, phenylacetic, cyclohexane carboxylic, crotonic, furoic, heptanoic, eicosanoic, etc. Examples of carboxylic acid salts of noble metals than can be employed include rhodium formate, palladium acetate, palladium proprionate, iridium butyrate, palladium pivalate, palladium octanoate, osmium isooctaonate, palladium benzoate, palladium laurate, ruthenium stearate, palladium isobutyrate, palladium para toluate, phatinum gamma-chlorobutyrate, ruthenium tetracontanoate, osmium phenylacetate, iridium cyclohexane carboxylate, rhodium crotonate, palladium fuorate, palladium heptanoate, palladium eicosanoate, etc.

In order to obtain the desired conversion herein it is imperative that the above materials be brought into contact with each other in the presence of a substance selected from the group consisting of nitrate ions and species convertible to nitrate ions. By "nitrate ions" I mean $NO_3^-$, a singly charged anion containing one nitrogen atom and three oxygen atoms. By "species convertible to nitrate ions" I mean to include compounds, ions, or radicals containing nitrogen and oxygen which by ionization, oxidation or disproportionation under conditions defined herein give $NO_3^-$, such as nitric acid, nitric oxide, nitrous anhydride, nitrite on, nitrous acid, nitrogen dioxide, nitrogen tetraoxide, nitric anhydride, etc. Additionally, there must be present in the reaction system perchloric acid.

Preferably the reactants employed herein are heated together in a solvent which will not adversely affect the course of the reaction and will not react with the reactants and/or the products produced herein. In a preferred embodiment, however, the solvent is a carboxylic acid, straight or branched chain, having from one to 10 carbon atoms, preferably from two to six carbon atoms, specific examples of which have been set forth above.

The reaction defined herein is simply effected by bringing the materials together into contact with each other under specified conditions. The amount of iron, noble metal, or compounds thereof, as metal, on a molar basis, can range from about 0.0001 percent to about 5 percent, preferably from about 0.01 percent to about one percent. The amount of nitrate ion employed, on a molar basis, relative to the aromatic compound, can be from about 1:1 to about $1:10^6$, preferably from about 1:3 to about $1:10^5$. The amount of perchloric acid relative to the aromatic compound can be from about 10:1 to about 1:100, preferably from about 5:1 to about 1:5. The amount of solvent employed can be from about 0.1 to about 1000 mols, preferably from about one to about 50 mols, per mol of aromatic compound. The temperature employed during the process can range from about 40° to about 200° C., preferably from about 60° to about 150° C., the pressure from about 0.1 to about 10,000 pounds per square inch gauge, preferably from about 10 to about 1000 pounds per square inch gauge, and the contact time from about 0.1 to about 100, preferably from about one to about 10 hours.

At the end of the reaction period, the desired chloro aromatic can be recovered from the reaction mixture in any suitable manner, for example, by adding sufficient excess water to wash out unreacted perchloric acid and then subjecting the organic phase to distillation, for example, at a temperature of about 40° to about 200° C. and a pressure of about 0.0001 to about 10 pounds per square inch gauge. Depending on the boiling points of the products in the reaction mixture the individual components thereof, including the desired chloro aromatic, will come off individually overhead and can be easily recovered.

The process of the invention can further be illustrated by the following.

Example I

A mixture of 0.60 gram of palladium nitrate, five milliliters of benzene and 25 milliliters of one normal solution of perchloric acid in acetic acid was refluxed at 115° C. and atmospheric pressure for 24 hours. The product by gas chromatographic analysis was shown to contain 0.44 percent chlorobenzene which represents a 40 percent yield based on palladium and on perchloric acid.

Example II

A mixture of five millimols of palladium acetate, 10 millimols of nitric acid, 10 millimols of perchloric acid dissolved in 100 milliliters of glacial acetic acid and 86 millimols of benzene (a total of 112 grams) was refluxed at 115° C. and atmospheric pressure for 19 hours. The product upon analysis by gas chromatography was shown to contain 0.21 percent chlorobenzene and 0.11 percent biphenyl.

Example III

A mixture of 1.15 grams of palladium nitrate, 100 milliliters of acetic acid containing 10 millimols of perchloric acid and 6.7 grams of toluene was refluxed at 115° C. and atmospheric pressure for 19 hours. Gas chromatographic analysis of the product indicated it contained 0.01 percent chlorotoluenes and 0.01 percent of dichlorotoluenes.

Example IV

Heating a mixture of 1.15 grams of palladium nitrate, 100 milliliters of acetic acid containing ten milliliters of perchloric acid and 6.7 grams of methyl benzoate at 118° C. and atmospheric pressure for 19 hours gave a product that was shown by gas chromatographic analysis to contain 0.10 percent methyl chlorobenzoate.

Example V

A mixture of 1.0 gram of ferric acetate, 6.7 grams of benzene, 100 milliliters of glacial acetic acid containing 10 millimols of perchloric acid and 0.90 grams of 70 percent aqueous nitric acid was refluxed at 115° C. for 24 hours. Analysis by gas chromatography showed the product contained 0.035 percent chlorobenzene.

Example VI

That the chlorine-containing compound herein must be perchloric acid is illustrated by the following. Into a 50-milliliter flask there were placed 25 milliliters of a solution consisting of 50 percent by weight of benzene and 50 percent by weight of acetic acid, one millimol of palladium acetate and five millimols of lithium perchlorate. After refluxing for 24 hours at atmospheric pressure and a temperature of 115° C. the system was analyzed by gas chromatography, five millimols of nitric acid was added and after an additional 68 hours of reflux analyzed again. At the end of 24 hours some phenyl acetate and biphenyl was noted and at the end of 68 hours some nitro benzene was additionally noted, but in neither case was chloro benzene found.

Obviously, many modifications and variations of the invention, as hereinabove set forth, can be made without departing from the spirit and scope thereof, and therefore only such limitations should be imposed as are indicated in the appended claims.

I claim:

1. A process for preparing a nuclear chloro aromatic which comprises heating an aromatic compound selected from the group consisting of an aromatic hydrocarbon, a halogenated aromatic hydrocarbon and an ester of an aromatic acid with a catalyst selected from the group consisting of iron, a Group 8 noble metal, a compound of iron or a compound of a Group 8 noble metal, a substance selected from the group consisting of nitrate ions and species convertible to nitrate ions, a carboxylic acid solvent having from one to 10 carbon atoms and perchloric acid.

2. The process of claim 1 wherein said aromatic compound is an aromatic hydrocarbon.

3. The process of claim 1 wherein said aromatic hydrocarbon is benzene.

4. The process of claim 1 wherein said aromatic compound is methyl benzoate.

5. The process of claim 1 wherein said catalyst is a carboxylic acid salt of a noble metal.

6. The process of claim 1 wherein said catalyst is a carboxylic acid salt of palladium.

7. The process of claim 1 wherein said catalyst is palladium acetate.

8. The process of claim 1 wherein said catalyst is palladium nitrate.

9. The process of claim 1 wherein said catalyst is ferric acetate.

10. The process of claim 1 wherein said nitrate ion obtained from nitric acid.

11. The process of claim 1 wherein the reaction is carried out in acetic acid as solvent.

12. The process of claim 1 wherein said nitrate ion is obtained from nitric acid and said catalyst is palladium nitrate.

References Cited

UNITED STATES PATENTS 3,136,810   6/1964   Newcomer et al. _____ 260—473
3,160,653   12/1964  Benning et al. _____ 260—465

LORRAINE A. WEINBERGER, Primary Examiner

E. J. GLEIMAN, Assistant Examiner

U.S. Cl. X.R.

260—650